United States Patent [19]

Nozawa et al.

[11] Patent Number: 4,896,172

[45] Date of Patent: Jan. 23, 1990

[54] LIQUID INJECTION RECORDING APPARATUS INCLUDING RECORDING LIQUID CIRCULATION CONTROL

[75] Inventors: Minoru Nozawa, Machida; Yutaka Koizumi, Tokyo; Toshihiro Mori, Kawasaki; Atsushi Saito, Yokohama, all of Japan

[73] Assignee: Canon Kabushiki Kaisha, Tokyo, Japan

[21] Appl. No.: 271,645

[22] Filed: Nov. 16, 1988

[30] Foreign Application Priority Data

Nov. 20, 1987 [JP] Japan ................................ 62-291963
Nov. 20, 1987 [JP] Japan ................................ 62-291967

[51] Int. Cl.[4] .......................... G01D 15/16; B41J 3/04
[52] U.S. Cl. ................................................ 346/140 R
[58] Field of Search ......................................... 346/140

[56] References Cited

U.S. PATENT DOCUMENTS 4,737,801 4/1988 Ichihashi ............................ 346/140
4,791,440 12/1988 Eldridge ............................ 346/140

FOREIGN PATENT DOCUMENTS 56-44664 4/1981 Japan .
56-86762 7/1981 Japan .
57-193371 11/1982 Japan .
0206658 9/1986 Japan .

*Primary Examiner*—Joseph W. Hartary
*Attorney, Agent, or Firm*—Fitzpatrick, Cella, Harper & Scinto

[57] ABSTRACT

A liquid injection recording apparatus comprises a recording head having discharge ports for discharging recording liquid therethrough, a liquid path communicating with the discharge ports, a liquid chamber communicating with the liquid path and energy generating elements utilized for discharging the recording liquid, a temperature sensor for detecting the temperature of the recording head and/or the recording liquid in the recording head, a storing tank for storing the recording liquid to be supplied to the recording head, a communicating path for switchably communicating between a supply system for supplying the recording liquid from the storing tank to the liquid chamber and a circulation system for circulating the recording liquid between the storing tank and the liquid chamber, a switching device for switching the communicating path to either of the supply system or the circulation system in accordance with temperature information from the temperature sensor, and a control circuit for controlling the switch.

15 Claims, 6 Drawing Sheets

LIQUID INJECTION RECORDING APPARATUS INCLUDING RECORDING LIQUID CIRCULATION CONTROL

BACKGROUND OF THE INVENTION

1. Field of the Invention

The present invention relates to a liquid injection recording apparatus, and, more particularly, it relates to a liquid injection recording apparatus in which the recording is effected by liquid drops discharged from discharge ports.

2. Related Background Art

As a conventional liquid injection recording apparatus of this kind, a recording apparatus wherein minute liquid drops are discharged by creating pressure change in liquid passages due to the deformation of piezo-electric elements, and a recording apparatus wherein a pair of electrodes are further provided for deflecting liquid drops when discharged, has been already known. Further, various recording systems such as a recording apparatus wherein exothermic elements are arranged in liquid passages and liquid drops are discharged from discharge ports by bubbles generated by suddenly heating such exothermic elements have been proposed.

Among these conventional recording apparatuses, the last mentioned recording system, i.e., the system that utilizes thermal energy to discharge the liquid drops is particularly effective in that it is easy to arrange the discharge ports with high density and it is possible to record at a high speed. Further, as recording heads applicable to such a recording apparatus, a recording head of serial scanning type and a recording head of full-multi (full-line) type such that the discharge ports are arranged in correspondence to a width of the record are already known. Among them, the recording head of full-multi type is apparently effective in the high speed recording operation.

However, in the recording head used with the above-mentioned recording apparatus that utilizes thermal energy, when a high density recording operation such as a solid recording operation, particularly a high speed recording operation by high-frequency drive is carried out, there arise problems that the temperature of the recording head is excessively increased due to excessive heat which is not utilized to record (i.e., to form the liquid drops), thus changing the viscosity of the recording liquid or generating dissolved bubbles in the recording liquid, and that the formation of desired bubbles cannot be obtained when the temperature of the recording head is increased more than a certain value T1. The excessive temperature increase in the recording head often makes difficult the formation of the proper or normal liquid drops and/or changes the diameter of a dot, thus deteriorating the quality of the record. Further, since the bubbles (dissolved bubbles) created by releasing dissolved gas in the recording liquid do not vanish immediately, they remain in the recording head for a long time. As a result, they absorb the sudden pressure change required for forming the liquid drops due to the formation of bubbles, thus often resulting to non-discharge of the liquid drops.

For these reasons, in the conventional recording apparatus, in order to cope with the above problems and disadvantages, when the temperature of the recording head reached a predetermined value T2 set lower than the temperature T1, the recording operation was temporarily stopped until the recording head was cooled to a certain temperature, and thereafter the recording operation was started again. Particularly, such temperature increase should cause a remarkable problem, since when the recording head is of full-multi type including the recording system for forming the liquid drops by utilizing thermal energy, the number of the exothermic elements (heating elements) may be a few thousand. However, if the recording operations are temporarily stopped, the advantage of high speed recording is lost, even when the recording system for permitting the high speed recording operation is used and the ability of such a recording system cannot be effectively utilized.

SUMMARY OF THE INVENTION

Accordingly, an object of the present invention is to provide a liquid injection recording apparatus adapted particularly for a full-multi type recording system for performing the recording operation by means of drops of the recording liquid discharged by utilizing thermal energy, which can quickly reduce the temperature of a recording head even if the temperature of the recording head is increased, thus restoring recording ability quickly to utilize the whole ability of the recording head, thereby performing a high speed recording operation with high quality.

To achieve the above-mentioned object, a liquid injection recording apparatus according to the present invention is so constructed as to prevent the increase in temperature of recording liquid in a recording head, or of the recording head itself, by circulating the recording liquid which is supplied to a common liquid chamber formed in the recording head, between the common chamber and a recording head storing tank.

Further, a liquid injection recording apparatus according to the present invention for achieving the above-mentioned object is so constructed as to prevent the increase in temperature of recording liquid in a recording head or of the recording head itself by circulating the recording liquid which is supplied to a secondary chamber and/or a common chamber formed in the recording head, between the secondary and/or common chamber and a recording liquid storing tank.

According to the present invention, the temperature of the recording head can be quickly lowered to a desired range of temperature, even when the temperature of the recording head increases above a predetermined value.

Further, since the temperature of the recording head can easily be restored to the desired range of temperature quickly, the recording ability can also be restored in a very short time, thus fully utilizing the latent recording faculties of a recording system for performing the recording operation by means of drops of the recording liquid discharged by utilizing thermal energy, thereby realizing a more high speed recording operation with high quality.

A further object of the invention is to provide a liquid injection recording apparatus comprising:

- a recording head having discharge ports for discharging recording liquid therethrough, a liquid path communicating with said discharge ports, a liquid chamber communicating with said liquid path and energy generating elements utilized for discharging said recording liquid;
- a temperature sensor for detecting the temperature of said recording head and/or said recording liquid in said recording head;

a storing tank for storing said recording liquid to be supplied to said recording head;

a communicating path for switchably communicating between a supply system for supplying said recording liquid from said storing tank to said liquid chamber and a circulation system for circulating said recording liquid between said storing tank and said liquid chamber;

switching means for switching said communicating path to either of said supply system or said circulation system in accordance with temperature information from said temperature sensor and;

a control circuit for controlling said switching means.

A still further object of the invention is to provide a liquid injection recording apparatus comprising:

a recording head having discharge ports for discharging recording liquid therethrough, a liquid path communicating with said discharge ports, a liquid chamber communicating with said liquid path, energy generating elements utilized for discharging said recording liquid and a sub-chamber provided at least opposed to said liquid path;

a temperature sensor for detecting the temperature of said recording head and/or said recording liquid to be supplied to said recording head;

a storing tank for storing said recording liquid to be supplied to said recording head;

a communicating path for communicating said storing tank with said recording liquid and said sub-chamber;

switching means for switching said communicating path to either of a supply system for supplying said recording liquid from said storing tank to said recording head and a circulation system for circulating said recording liquid between said storing tank and said recording head;

a control circuit for controlling said switching means.

Still a further object of the invention is to provide a liquid injection recording apparatus comprising:

a recording head having discharge ports for discharging recording liquid therethrough, a liquid path communicating with said discharge ports, a liquid chamber communicating with said liquid path and energy generating elements utilized for discharging said recording liquid;

a temperature sensor for detecting the temperature of said recording head and/or said recording liquid in said recording head;

a communicating path connected to said recording head at both ends thereof and having a storing tank for storing said recording liquid;

a pump provided in said communicating path;

switching means provided in said communicating path for substantially connecting/disconnecting the flow of said recording liquid in said communicating path; and a control circuit for switching said switching means in accordance with temperature information from said temperature sensor.

Yet another object of the invention is to provide a liquid injection recording apparatus comprising:

a recording head having discharge ports for discharging recording liquid therethrough, a liquid path communicating with said discharge ports, a liquid chamber communicating with said liquid path, energy generating elements utilized for discharging said recording liquid and a sub-chamber provided at least opposed to said liquid path;

a temperature sensor for detecting the temperature of said recording head and/or said recording liquid in said recording head;

a first communicating path connected to said recording head at both ends thereof and having a storing tank for storing said recording liquid;

a plurality of second communicating paths one end of which is connected to said sub-chamber of said recording head and another end of which is connected to said first communicating path;

switching means respectively provided in said first communicating path and said second communicating path for substantially connecting/disconnecting the flow of said recording liquid; and a control circuit for switching said switching means in accordance with temperature information from said temperature sensor.

DETAILED DESCRIPTION OF THE PREFERRED EMBODIMENTS

The present invention will now be explained in connection with the accompanying drawings.

First of all, a liquid injection recording apparatus according to a first embodiment of the present invention will be explained below with reference to FIGS. 1A–1C and FIG. 2.

Figure 1A:
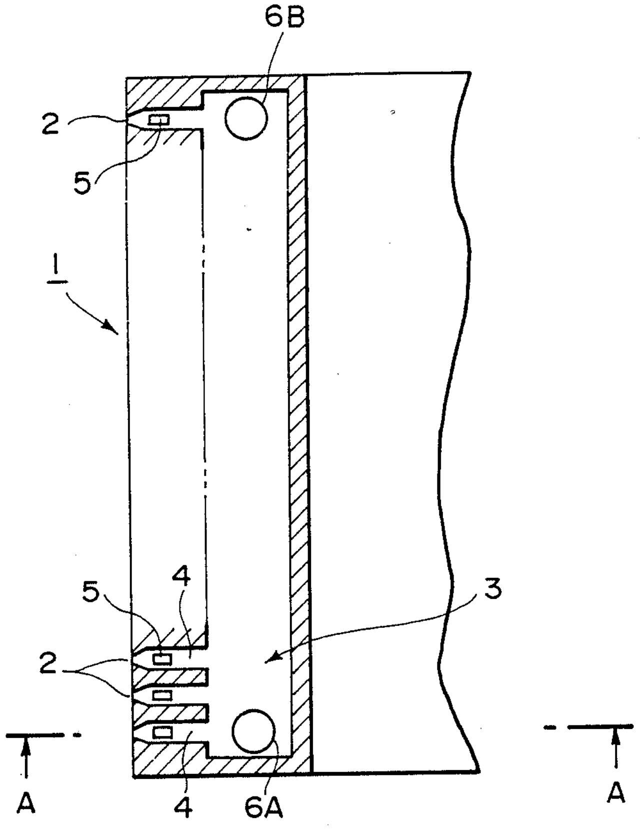
FIG. 1A is a schematic partial sectional view of a main portion of a recording head used with a liquid injection recording apparatus according to a first embodiment of the present invention.
Figure 1B:
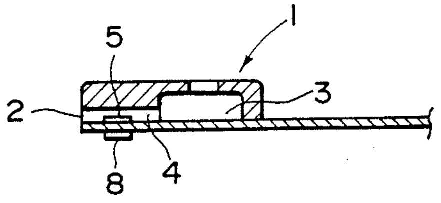
FIG. 1B is a schematic sectional view of the recording head taken along the line A—A of FIG. 1A.
Figure 1C:
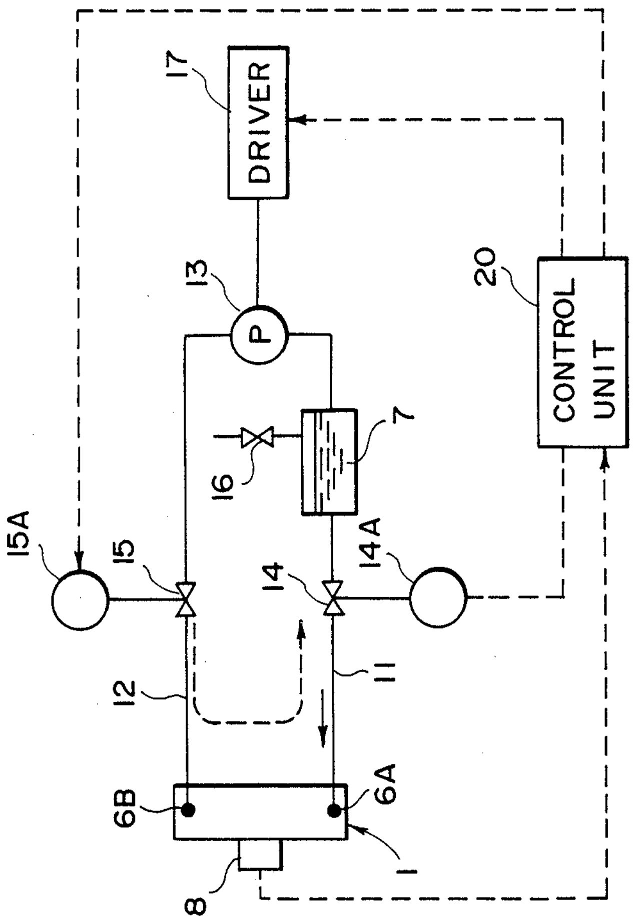
FIG. 1C is a block diagram showing a preferred example of a construction of a recording liquid supplying, cooling and circulating device used with the recording apparatus of the first embodiment.

FIGS. 1A–1C show a first embodiment of the present invention. In FIGS. 1A and 1B, a recording head 1 of full-multi type can move relative to a recording medium (not shown) to record images on the recording medium by discharging recording liquid from discharge ports 2 facing the recording medium, in response to recording signals. The recording head 1 includes a common liquid chamber 3 formed therein, and a plurality of liquid passages 4 for directing the recording liquid from the common chamber 3 to the corresponding discharge ports 2. Exothermic or heating elements 5 (for example, electrical-thermal converters) are arranged in the corresponding liquid passages 4 arranged at predetermined intervals as shown in FIG. 1A. The common liquid chamber 3 includes a supply port 6A through which the recording liquid is supplied to the common chamber 3, and a return port 6B for returning the recording liquid from the common chamber 3 to a recording liquid storing tank 7 (FIG. 1C) (referred to as merely "tank" hereinafter). Further, in the illustrated first embodiment, a temperature sensor 8 is mounted on the back of a wall of the recording head 1 (opposite to the heating elements 5) in confronting relation to the heating elements 5 in the liquid passages 4, as shown in FIG. 1B.

FIG. 1C shows a recording liquid supplying and circulating system associated with the so constructed recording head 1. The reference numeral 11 designates a supply conduit for supplying the recording liquid from the tank 7 to the recording head 1, and the reference numeral 12 designates a circulating conduit for supplying the recording liquid to the head 1 and returning the recording liquid to the tank 7 by means of a pump 13 when the head 1 is cooled, as described later. The supply conduit 11 and the circulating conduit 12 are provided with valves such as solenoid valves 14 and 15, respectively. The tank 7 includes a vent valve 16. The pump 13 is driven by a driver 17, and the solenoid valves 14, 15 are controlled by corresponding switch elements 14A and 15A, respectively. A control unit 20 controls the energization and disenergization of the solenoid valves 14, 15 and pump 13 in response to a temperature detect signal from the temperature sensor 8, as will be described later.

Figure 2:
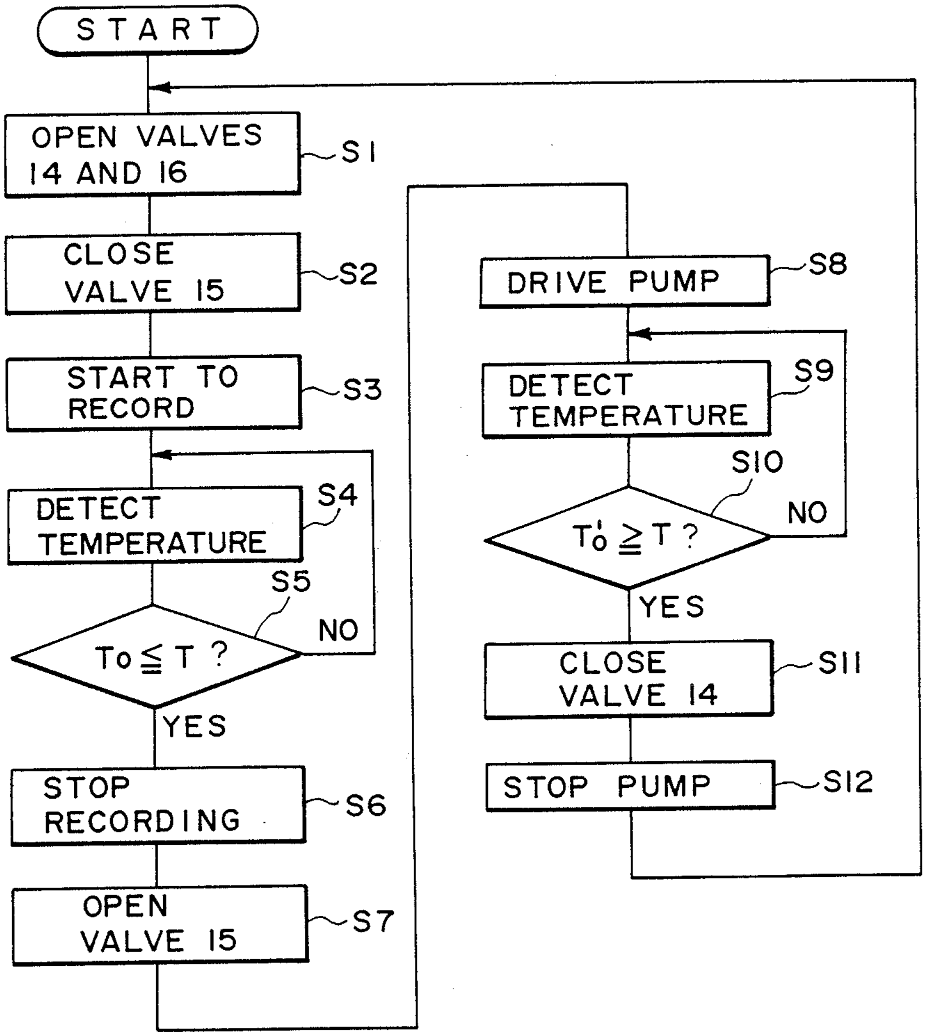
FIG. 2 is a flow chart for explaining an example of a control sequence of the liquid injection recording apparatus of the first embodiment.

Next, the control sequence of the recording apparatus according to the first embodiment will be explained with reference to FIG. 2.

When the recording operation is desired to start, the solenoid valve 14 and the vent valve 16 are opened in a step S1, and the solenoid valve 15 is closed in a next step S2. Then, the recording head 1 is driven to start the recording operation in a step S3, and then the temperature of the head 1 is detected by the temperature sensor 8 in a step S4. Thereafter, a step S5 determines whether the detected temperature T of the recording head 1 reaches an upper permissible limit temperature $T_0$ on the basis of the temperature detect signal from the temperature sensor 8, and monitors the head until the detected temperature T reaches the upper limit temperature $T_0$. And, if the step S5 judges that the temperature T has reached the temperature $T_0$, the sequence goes to a step S6, where the recording operation is temporarily stopped. Then, the sequence immediately goes to a step S7, where the solenoid valve 15 associated with the supply conduit 11 is opened. Then, in a step S8 the pump 13 is driven to circulate the recording liquid between the tank 7 and the common liquid chamber 3 of the recording head 1 in a direction shown by a broken line in FIG. 1C, while detecting the temperature again in a step S9. A step S10 determines whether the detected temperature T reaches a lower limit temperature $T_0'$ suitable to the recording operation. The circulation of the recording liquid is continued until the detected temperature T reaches the lower limit temperature $T_0'$. When it is judged that the temperature T has reached the temperature $T_0'$, the solenoid valve 14 associated with the supply conduit 11 is closed in step S11, and the pump 13 is disenergized in a step S12. Then, the sequence returns to the step S1. Further, in restoring operation for positively discharging the recording liquid from the discharge ports 2 under pressure, such restoring operation may be performed at a point that the valve 14 is closed in the step S11.

In the illustrated first embodiment, although an example that the recording head 1 is cooled through the recording liquid only by the circulation of the recording liquid by means of the pump 13 was described, it is possible to further provide a fan (not shown) to cool the recording head 1 directly while circulating the recording liquid or to cool the recording liquid being circulated, thus shortening the cooling time and accordingly, shut-down time of the apparatus, thereby improving the efficiency of the recording operation.

Of course, the temperature when the circulation of the recording liquid is stopped is not limited to the above-mentioned lower limit temperature $T_0'$ suitable to the recording operation. That is to say, such temperature can be set to any temperature $T_0''$ between the lower limit temperature $T_0'$ suitable to the recording operation and the upper limit temperature $T_0$. In other words, the temperature $T_0''$ may meet the relation $T_0' \leqq T_0'' \leqq T_0$. However, if the temperature $T_0''$ is near the temperature $T_0$, since the liquid circulation mode is started again shortly after the recording operation is re-started, the temperature $T_0''$ should preferably be set to a value near the temperature $T_0'$, and more preferably set to the relation $T_0''=T_0'$. However, since it may be the case that the temperature of the recording head cannot be lowered to the temperature $T_0'$ by the circulation of the recording liquid, it is desirable to set temperature $T_0''$ properly.

As mentioned above, according to the first embodiment of the present invention, even if the temperature of the recording head is increased, since the recording head can be quickly cooled through the recording liquid by circulating the recording liquid between the common liquid chamber in the recording head and the tank by means of the pump, even when the recording operation is temporarily stopped, the recording operation can quickly be re-started, thus carrying out the high speed recording operation effectively with high quality while maintaining stable discharging operation of the liquid.

Further, an amount of the recording liquid to be circulated can be suitably selected experimentally on the basis of the cooling ability of the liquid; however, it is desirable to set the circulating amount of the liquid to the extent that the recording liquid does not leak from the discharge openings while being circulated, thus shortening the shut-down time of the apparatus and preventing contamination of the recording medium.

Next, a liquid injection recording apparatus according to a second embodiment of the present invention will now be explained with reference to FIGS. 3A-3C and FIG. 4.

Figure 3A:
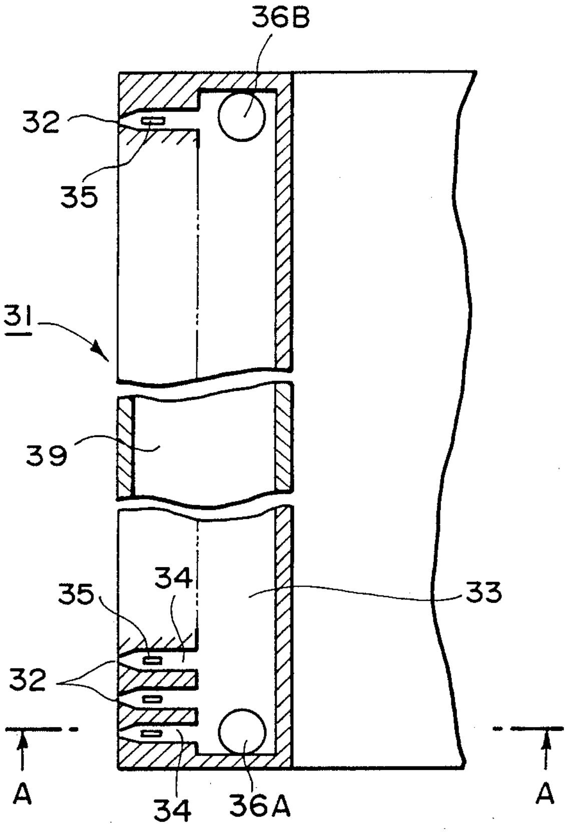
FIG. 3A is a schematic partial sectional view of a main portion of a recording head used with a liquid injection recording apparatus according to a second embodiment of the present invention.
Figure 3B:
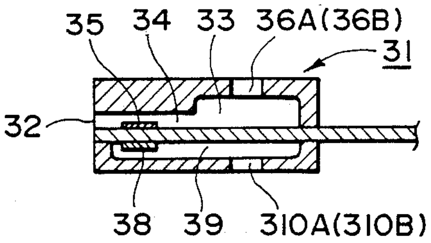
FIG. 3B is a schematic sectional view of the recording head taken along the line A—A of FIG. 3A.
Figure 3C:
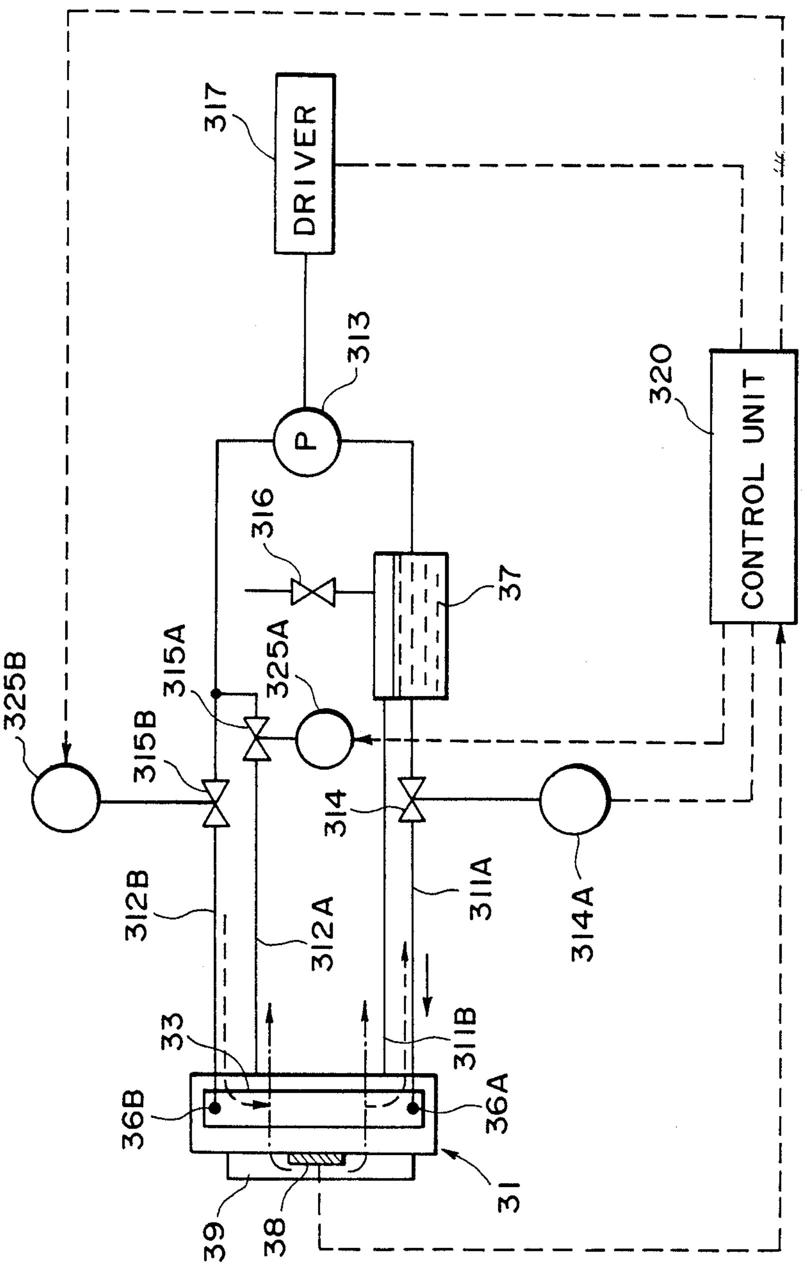
FIG. 3C is a block diagram showing a preferred example of a construction of a recording liquid supplying, cooling and circulating device used with the recording apparatus of the second embodiment.

FIGS. 3A-3C show a second preferred embodiment of the present invention. In FIGS. 3A and 3B, a recording head 31 of full-multi type can move relative to a recording medium (not shown) to record images on the recording medium by discharging recording liquid from discharge ports 32 facing the recording medium, in response to recording signals. The recording head 31 includes a common liquid chamber 33 formed therein, and a plurality of liquid passages 34 for directing the recording liquid from the common chamber 33 to the corresponding discharge openings 32. Heating elements 5 are arranged in the corresponding liquid passages 34 arranged at predetermined intervals as shown in FIG. 3A. The common liquid chamber 33 includes a supply port 36A through which the recording liquid is supplied to the common chamber 33, and a second feed port 36B for feeding the recording liquid from a recording liquid storing tank 37 (FIG. 3C) (referred to as merely "tank" hereinafter) to the common chamber 33 when the recording liquid is circulated through the common liquid chamber 33. Further in the illustrated second embodiment, as shown in FIG. 3B, a temperature sensor 38 is mounted on the back of a wall of the recording head 31 opposite to the liquid passages 34, and a secondary chamber 39 is formed to enclose the temperature sensor. The secondary chamber 39 is provided at its both ends with a supply port 310A for supplying the recording liquid to the chamber 39 and a return port 310B for returning the recording liquid to the tank 37.

FIG. 3C shows a recording liquid supplying, cooling and circulating system associated with the so constructed recording head 31. The reference numeral 311A designates a supply conduit for supplying the recording liquid from the tank 37 to the recording head 31, and the reference numeral 311B designates a return conduit for returning the recording liquid from the secondary chamber 39 to the tank 37. The reference numeral 312A designates a feed conduit for supplying the recording liquid to the secondary chamber 39 of the recording head 31 by means of a pump 313 when the head 31 is cooled, and the reference numeral 312B designates a second feed conduit for feeding the recording liquid to the common liquid chamber 33 of the head 31 when the recording liquid is circulated. The supply conduit 311A, the cooling feed conduit 312A and the circulating second feed conduit 312B are provided with valves such as solenoid valves 314, 315A and 315B, respectively. The tank 37 includes a vent valve 316. The pump 313 is driven by a driver 317, and the solenoid valves 314, 315A and 315B are controlled by corresponding switch elements 314A, 325A and 325B, respectively. A control unit 320 controls the energization and disenergization of the solenoid valves 314, 315A, 315B and pump 313 in response to a temperature detect signal from the temperature sensor 38, as will be described later.

Next, the control sequence of the recording apparatus according to the second embodiment will now be explained with reference to FIG. 4.

When the recording operation is desired to start, the solenoid valve 314 and the vent valve 316 are opened in a step S31, and the solenoid valves 315A and 315B are closed in a next step S32. Then, the recording head 31 is driven to start the recording operation in a step S33, and then the temperature of the recording head 31 is detected by the temperature sensor 38 in a step S34. Thereafter, a step S35 determines whether the detected temperature T of the recording head 31 reaches a predetermined upper limit temperature $T_0$ on the basis of the temperature detect signal from the temperature sensor 38, and monitors the head until the detected temperature T reaches the upper limit temperature $T_0$. And, if the step S35 judges that the temperature T has reached the upper limit temperature $T_0$. the sequence goes to a step S36, where the solenoid valve 315A associated with the cooling feed conduit 312A is opened. Then, in a step S37 the pump 313 is driven to circulate the recording liquid between the tank 37 and the secondary chamber 39 of the recording head 31 in a direction shown by a chain and dot line in FIG. 3C, while detecting the temperature again in a step S38. A step S39 determines whether the detected temperature T reaches a predetermined lower limit temperature $T_0'$ suitable to the recording operation. The circulation of the recording liquid is continued until the detected temperature T reaches the lower limit temperature $T_0'$. When it is judged that the temperature T has reached the lower limit temperature $T_0'$, the cooling solenoid valve 315A is closed in a step S40, and the pump 313 is stopped in a step S41.

Then, it is determined whether the recording operation is further continued or not in a step S42; and if YES, the sequence returns to the step S34 again, thus continuing the detection of the temperature. On the other hand, if no (not continued), the liquid supplying solenoid valve 314 and the vent valve 316 of the tank 37 is closed in a step S43.

Figure 4:
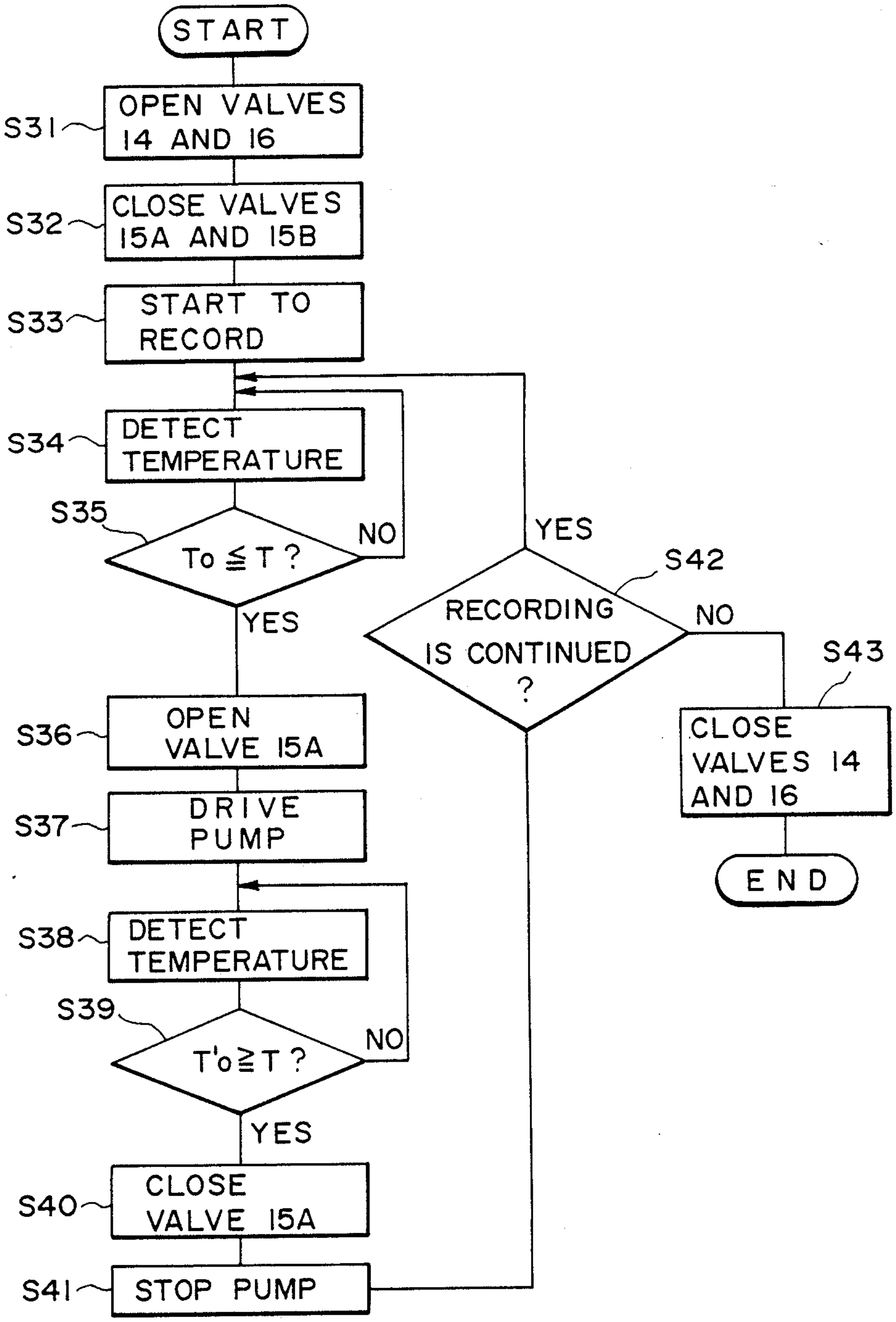
FIG. 4 is a flow chart for explaining an example of control sequence of a the liquid injection recording apparatus of the second embodiment.

Further, although not shown in FIG. 4, when the restoring operation is desired, the solenoid valve 314 is closed and the circulating solenoid valve 315B is opened, and the pump 313 is driven to discharge the recording liquid from the discharge openings 32.

Furthermore, if the recording operation may be temporarily stopped when the temperature of the recording head 31 is increased, it is possible to control, for quickly cooling the head, by circulating the recording liquid through both the secondary chamber 39 and the common liquid chamber 33.

Incidentally, in the illustrated second embodiment, although an example that the recording head 31 is cooled through the recording liquid only by the circulation of the recording liquid by means of the pump 313 was described, it is possible to further provide a fan (not shown) to cool the recording head 31 directly while circulating the recording liquid or to cool the recording liquid being circulated, thus shortening the cooling time and accordingly shut-down time of the apparatus, thereby improving the efficiency of the recording operation.

As mentioned above, according to the second embodiment of the present invention, even if the temperature of the recording head is increased, since the recording head can be quickly cooled through the recording liquid by circulating the recording liquid between the secondary chamber in the recording head and the tank by means of the pump, even when the recording operation is not stopped, the temperature of the recording head can be decreased, thus carrying out the high speed recording operation effectively with high quality while maintaining stable discharging operation of the liquid.

Of course, the temperature when the circulation of the recording liquid is stopped is not limited to the above-mentioned lower limit temperature $T_0'$ suitable to the recording operation. That is to say, such temperature can be set to any temperature $T_0''$ between the lower limit temperature $T_0'$ suitable to the recording operation and the upper limit temperature $T_0$. In other words, the temperature $T_0''$ may meet the relation $T_0' \leqq T_0'' \leqq T_0$. However, if the temperature $T_0''$ is near the temperature $T_0$, since the liquid circulation mode is started again shortly after the recording operation is re-started, the temperature $T_0''$ should preferably be set to a value near the temperature $T_0'$, and more preferably set to the relation $T_0''=T_0'$. However, since it may be the case that the temperature of the recording head cannot be lowered to the temperature $T_0'$ by the circulation of the recording liquid, it is desirable to set temperature $T_0''$ properly.

Further, when the recording liquid in the common liquid chamber as well as the recording liquid in the secondary chamber is circulated, an amount of the recording liquid to be circulated can be suitably selected experimentally on the basis of the cooling ability of the liquid; however, it is desirable to set the circulating amount of the liquid to the extent that the recording liquid does not leak from the discharge ports while being circulated, thus shortening the shut-down time of the apparatus and preventing contamination of the recording medium.

What is claimed is:

1. A liquid injection recording apparatus comprising
 a recording head having discharge ports for discharging recording liquid therethrough, a liquid path communicating with said discharge ports, a liquid chamber communicating with said liquid path and energy generating elements utilized for discharging said recording liquid;
 a temperature sensor for detecting the temperature of said recording head and/or said recording liquid in said recording head;
 a storing tank for storing said recording liquid to be supplied to said recording head;
 a communicating path for switchably communicating between a supply system for supplying said recording liquid from said storing tank to said liquid chamber and a circulation system for circulating said recording liquid between said storing tank and said liquid chamber;
 switching means for switching said communicating path to either of said supply system or said circulation system in accordance with temperature information from said temperature sensor; and
 a control circuit for controlling said switching means.

2. A liquid injection recording apparatus according to claim 1, wherein said switching means includes a valve.

3. A liquid injection recording apparatus according to claim 1, wherein said liquid chamber is communicated with said communicating path at least two locations.

4. A liquid injection recording apparatus according to claim 1, wherein said temperature sensor is provided in said recording head.

5. A liquid injection recording apparatus according to claim 1, wherein said energy generating elements are electrothermal energy generating elements for generating thermal energy.

6. A liquid injection recording apparatus according to claim 1, wherein said communicating path includes a pump for circulating said recording liquid in said circulating system.

7. A liquid injection recording apparatus comprising:
 a recording head having discharge ports for discharging recording liquid therethrough, a liquid path communicating with said discharge ports, a liquid chamber communicating with said liquid path, energy generating elements utilized for discharging said recording liquid and a sub chamber provided at least opposed to said liquid path;
 a temperature sensor for detecting the temperature of said recording head and/or said recording liquid to be supplied to said recording head;
 a storing tank for storing said recording liquid to be supplied to said recording head;
 a communicating path for communicating said storing tank with said recording liquid and said sub-chamber;
 switching means for switching said communicating path to either of a supply system for supplying said recording liquid from said storing tank to said recording head and a circulation system for circulating said recording liquid between said storing tank and said recording head; and
 a control circuit for controlling said switching means.

8. A liquid injection recording apparatus according to claim 7, wherein said switching means includes a valve.

9. A liquid injection recording apparatus according to claim 7, wherein said temperature sensor is provided in said recording head.

10. A liquid injection recording apparatus according to claim 7, wherein said temperature sensor is provided in said sub-chamber.

11. A liquid injection recording apparatus according to claim 7, wherein said energy generating elements are electrothermal energy generating elements for generating thermal energy.

12. A liquid injection recording apparatus according to claim 7, wherein said communicating path includes a pump for circulating said recording liquid in said circulating system.

13. A liquid injection recording apparatus according to claim 7, wherein said liquid chamber and said sub-chamber are communicated with said communicating path at least two locations.

14. A liquid injection recording apparatus comprising:
 a recording head having discharge ports for discharging recording liquid therethrough, a liquid path communicating with said discharge ports, a liquid chamber communicating with said liquid path and energy generating elements utilized for discharging said recording liquid;
 a temperature sensor for detecting the temperature of said recording head and/or said recording liquid in said recording head;
 a communicating path connected to said recording head at both ends thereof and having a storing tank for storing said recording liquid;
 a pump provided in said communicating path;
 switching means provided in said communicating path for substantially connecting/disconnecting the flow of said recording liquid in said communicating path; and
 a control circuit for switching said switching means in accordance with temperature information from said temperature sensor.

15. A liquid injection recording apparatus comprising:
 a recording head having discharge ports for discharging recording liquid therethrough, a liquid path communicating with said discharge ports, a liquid chamber communicating with said liquid path, energy generating elements utilized for discharging said recording liquid and a sub-chamber provided at least opposed to said liquid path;
 a temperature sensor for detecting the temperature of said recording head and/or said recording liquid in said recording head;
 a first communicating path connected to said recording head at both ends thereof and having a storing tank for storing said recording liquid;
 a plurality of second communicating paths each having one end of which is connected to said sub-chamber of said recording head and another end of which is connected to said first communicating path;
 switching means respectively provided in said first communicating path and said second communicating path for substantially connecting/disconnecting the flow of said recording liquid; and
 a control circuit for switching said switching means in accordance with temperature information from said temperature sensor.

* * * * *

UNITED STATES PATENT AND TRADEMARK OFFICE

CERTIFICATE OF CORRECTION

PATENT NO. : 4,896,172

DATED : January 23, 1990

INVENTOR(S) : MINORU NOZAWA, ET AL.

It is certified that error appears in the above-identified patent and that said Letters Patent is hereby corrected as shown below:

COLUMN 1

Line 61, "resulting to" should read --resulting in--.

COLUMN 5

Line 64, "restoring" should read --a restoring--.

COLUMN 8

Line 11, "no" should read --NO--.
Line 13, "is" should read --are--.

COLUMN 9

Line 9, "comprising" should read --comprising:--.
Line 35, "at least" should read --at at least--.
Line 52, "sub chamber" should read --sub-chamber--.

UNITED STATES PATENT AND TRADEMARK OFFICE

CERTIFICATE OF CORRECTION

PATENT NO. : 4,896,172

DATED : January 23, 1990

INVENTOR(S) : MINORU NOZAWA, ET AL.

It is certified that error appears in the above-identified patent and that said Letters Patent is hereby corrected as shown below:

COLUMN 10

Line 19, "at least" should read --at at least--.

Signed and Sealed this

Eighth Day of October, 1991

*Attest:*

HARRY F. MANBECK, JR.

*Attesting Officer*

*Commissioner of Patents and Trademarks*